United States Patent
Fernandez-Kirchberger

(12) 
(10) Patent No.: US 6,916,520 B2
(45) Date of Patent: *Jul. 12, 2005

(54) SET FOR LAMINATING A PRINT CARRIER ELEMENT WITH A PROTECTIVE FILM ELEMENT

(75) Inventor: Paul Fernandez-Kirchberger, München (DE)

(73) Assignee: PROMAXX Cards Vertriebs GmbH, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/385,776

(22) Filed: Mar. 11, 2003

(65) Prior Publication Data

US 2003/0175464 A1 Sep. 18, 2003

(30) Foreign Application Priority Data

Mar. 18, 2002 (DE) .................................. 202 04 281 U

(51) Int. Cl.[7] ................................................. B32B 3/14
(52) U.S. Cl. ...................... 428/77; 428/422; 428/423; 428/40.1; 428/42.1; 428/67; 428/220; 428/215; 283/74
(58) Field of Search ................................. 428/422, 423, 428/40.1, 42.1, 67, 77, 220, 215; 283/74

(56) References Cited

U.S. PATENT DOCUMENTS

| 4,273,816 A | * | 6/1981 | Tollette ...................... 428/34.2 |
| 5,705,243 A | * | 1/1998 | Mehta et al. ............... 428/40.1 |
| 6,514,587 B1 | * | 2/2003 | Fernandez-Kirchberger et al. ...... 428/40.1 |

* cited by examiner

Primary Examiner—Patrick Joseph Ryan
Assistant Examiner—Jane Rhee
(74) Attorney, Agent, or Firm—Muramatsu & Associates

(57) ABSTRACT

A set for forming a card such as an identity card with a protective film. The set has a carrier sheet, a print carrier layer and a protective film layer. The set further includes at least one print carrier element stamped out from the print carrier layer, and at least one protective film element stamped out from the protective film layer. The print carrier element and the protective film element are disposed in a mirror image relative to a fold axis formed in the carrier sheet. The protective film layer is formed by a hot-seal film layer, and the protective film element is disposed on the carrier sheet with a horizontal gap having a predetermined distance from the adjoining regions of the hot-seal film layer.

4 Claims, 1 Drawing Sheet

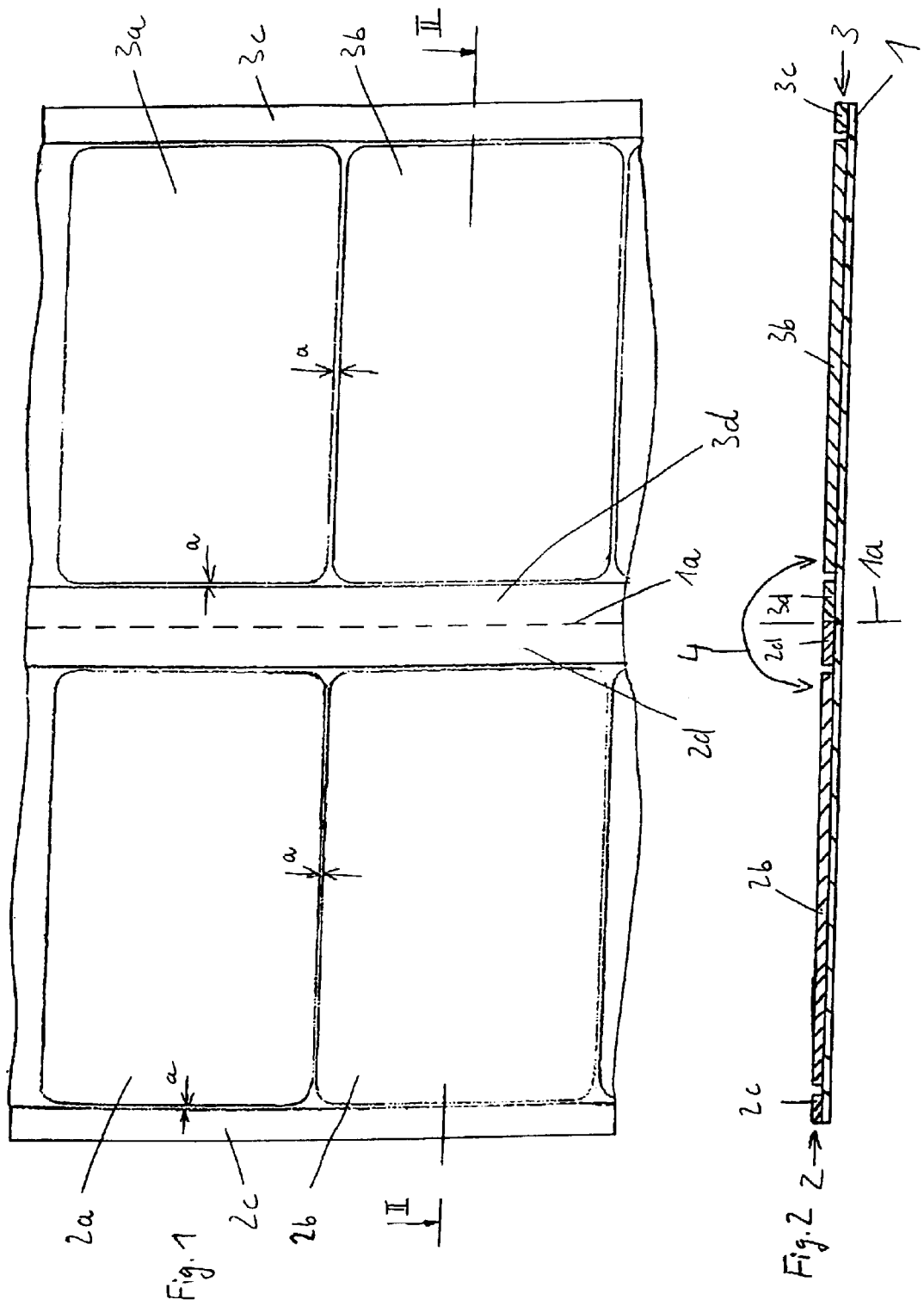

SET FOR LAMINATING A PRINT CARRIER ELEMENT WITH A PROTECTIVE FILM ELEMENT

FIELD OF THE INVENTION

This invention relates to a set with a carrier sheet, a print carrier layer and a protective film layer, wherein at least one print carrier element stamped out of the print carrier layer and at least one protective film element stamped out of the protective film layer are disposed in mirror image relative to a fold axis formed in the carrier sheet.

BACKGROUND OF THE INVENTION

Identity cards in credit card format are used in the most varied forms in practice. In most cases, variable data (name, etc.) are entered manually or by means of a printer. After the card has been printed on or written on, however, it should have a high degree of abrasion resistance. This is usually achieved by sealing the card with a transparent protective film.

Such a set is known from DE-A-198 34 879. In this set, the print carrier and the protective film are held spaced from one another on the carrier sheet. In the carrier sheet, a fold axis is formed, about which the print carrier and the protective film can be folded relative to one another. In this way the protective film can be applied exactly to the print carrier without the print carrier first having to be detached from its mounting on the carrier sheet. In the print carrier which is laminated in this way, the protective film merely covers the top face, while all edge regions remain free. Thus, a very attractive and high-quality product is obtained.

SUMMARY OF THE INVENTION

According to the invention, the set essentially comprises a carrier sheet, a print carrier layer and a protective film layer, wherein at least one print carrier element stamped out of the print carrier layer and at least one protective film element stamped out of the protective film layer are disposed in mirror image relative to a fold axis formed in the carrier sheet. In this case, the protective film layer is formed by a hot-seal film layer, and the protective film element stamped out of it is disposed on the carrier sheet with a gap having a predetermined distance from the adjoining regions of the hot-seal film layer.

If the set has a plurality of print carrier elements and a corresponding number of protective film elements, the same number of print carrier elements can be produced with a hot-seal film element in a simple manner with the aid of a hot-seal laminator.

In the tests on which the invention is based, the starting point was a set according to DE-A-198 34 879 in which the protective film was replaced by a hot-seal film. However, the results achieved thereby were relatively unsatisfactory, since during sealing the hot-seal film layer is clearly slightly enlarged so that the heated glue penetrates between the stamping lines and thus glues the print carrier element and adjoining regions of the print carrier layer together. The print carrier element laminated in this way can then only be detached from the set with great difficulty and very unsightly edge regions are produced.

The problem described above could only be avoided by the idea of disposing the protective film element on the carrier sheet with the gap having the predetermined distance from adjoining regions of the hot-seal film layer.

Moreover, in a preferred embodiment, the print carrier element is also disposed with a gap having a predetermined distance from the adjoining regions of the print carrier layer.

The predetermined distance of the gap between the protective film element and adjoining regions of the hot-seal film layer or respectively the print carrier element and adjoining regions of the print carrier layer should be at list 0.4 mm and at most 1.8 mm.

BRIEF DESCRIPTION OF THE DRAWINGS

Further advantages and embodiments of the invention are explained in greater detail below with reference to the description of an embodiment and the drawings, in which:

FIG. 1 shows a plan view of a portion of the set, and

FIG. 2 shows a sectional representation along the line II—II in FIG. 1.

DETAILED DESCRIPTION OF THE INVENTION

The set illustrated in FIGS. 1 and 2 consists essentially of a carrier sheet 1, a print carrier layer 2 and a hot-seal film layer (protective film layer) 3. A fold axis 1a is formed in the carrier sheet 1 for example by perforation. The print carrier layer 2 is applied on one side of the fold axis 1a and the hot-seal film layer 3 is applied on the other side. In order to retain these two layers, the carrier sheet is provided for example with an adhesive layer.

The print carrier layer 2 has at least one stamped out print carrier element 2a. In the portion of the set shown in FIG. 1, two print carrier elements 2a, 2b are shown which are in the form of a visiting card. Thus, the print carrier elements 2a, 2b are in the same layer as that of the print carrier layer 2 but are separated therefrom through a stamping process. Adjacent to the print carrier elements 2a, 2b, there are also lateral edge regions 2c, 2d of the print carrier layer. Protective elements 3a, 3b as well as lateral edge regions 3c and 3d are stamped out of the hot-seal film layer 3 in precise mirror image relative to the fold axis 1a. Thus, the protective elements 3a, 3b are in the same layer as that of the hot-seal film layer 3 but are separated therefrom through the stamping process.

The special feature resides in the fact that the protective elements 3a, 3b are disposed on the carrier sheet with a horizontal gap having a distance a from the adjoining regions of the hot-seal film layer. In this case, the adjoining regions of the hot-seal film layer can be formed by another protective film element and/or by the edge regions.

In the illustrated embodiment, the print carrier elements 2a, 2b are also disposed with a horizontal gap having a predetermined distance a from the adjoining regions of the print carrier layer 2. Such a set can be printed on in the region of the print carrier layer 2, for example by means of an ink-jet or laser printer.

Due to the mirror-image arrangement of the print carrier elements 2a, 2b relative to the protective film elements 3a, 3b, the protective film elements can be disposed exactly on the print carrier elements by folding about the fold axis 1a. The set once folded together in this way can then be delivered to a hot-seal laminator. In this way, all the print carrier elements retained on the set can be sealed in one operation.

In the tests on which the invention is based, it has been shown that the distance a between the protective film element and adjoining regions of the hot-seal film layer or respectively between the print carrier element and adjoining regions of the print carrier layer should be at least 0.4 mm and at most 1.8 mm. If the gap is too small, the problem of adhesion to adjoining regions occurs as described above. On the other hand, if the gap is chosen to be too large, there is a risk of adhesive from the carrier sheet being deposited in the printer.

In the production of the set, first of all, by means of an adhesive layer, the print carrier layer 2 is retained on the carrier sheet on one side of the fold axis 1a and the hot-seal film layer 3 is retained on the carrier sheet on the other side of the fold axis 1a. Then the print carrier elements 2a, 2b as well as the protective film elements 3a, 3b are stamped out, i.e., separated from the print carrier layer and hot-seal film layer 3, respectively, through the stamping operation. Also the fold axis 1a is produced in this stamping operation. The horizontal gaps having the distance a is produced by providing double cuts in this region. After the stamping operation, the resulting "waste grid" can then be removed from the carrier sheet.

What is claimed is:

1. A set for laminating a print carrier element, comprising:
   a carrier sheet;
   a print carrier layer formed on one side of the carrier sheet;
   a protective film layer formed on another side of the carrier sheet;
   at least one print carrier element which is a part of the print carrier layer and is stamped out from the print carrier layer; and
   at least one protective film element which is a part of the protective film layer and is stamped out from the protective film layer;
   wherein said print carrier element and said protective film element are disposed in a mirror image relative to a fold axis formed in the carrier sheet, and wherein the protective film layer is formed by a hot-seal film layer, and the protective film element is disposed on the carrier sheet with a horizontal gap having a predetermined distance from the adjoining regions of the hot-seal film layer; and
   wherein the predetermined distance of the horizontal gap between the print carrier element and adjoining regions of the print carrier layer is at least 0.4 mm and at most 1.8 mm.

2. A set as claimed in claim 1, wherein the print carrier element is disposed with a horizontal gap having a predetermined distance from adjoining regions of the print carrier layer.

3. A set as claimed in claim 1, wherein the predetermined distance of the horizontal gap between the protective film element and adjoining regions of the hot-seal film layer is at least 0.4 mm and at most 1.8 mm.

4. A set as claimed in claim 1, wherein the print carrier layer is applied on one side of the fold axis formed in the carrier sheet and the hot-seal film layer is applied on the other side of the fold axis.

* * * * *